United States Patent
Xu et al.

(10) Patent No.: US 11,978,470 B2
(45) Date of Patent: May 7, 2024

(54) TARGET SPEAKER SEPARATION SYSTEM, DEVICE AND STORAGE MEDIUM

(71) Applicant: INSTITUTE OF AUTOMATION, CHINESE ACADEMY OF SCIENCES, Beijing (CN)

(72) Inventors: Jiaming Xu, Beijing (CN); Jian Cui, Beijing (CN); Bo Xu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 1 day.

(21) Appl. No.: 17/980,473

(22) Filed: Nov. 3, 2022

(65) Prior Publication Data
US 2024/0005941 A1  Jan. 4, 2024

(30) Foreign Application Priority Data
May 30, 2022 (CN) .......................... 202210602186.2

(51) Int. Cl.
*G10L 21/0272* (2013.01)
*G10L 17/02* (2013.01)
(Continued)

(52) U.S. Cl.
CPC ............ *G10L 21/028* (2013.01); *G10L 17/02* (2013.01); *G10L 17/04* (2013.01); *G10L 17/06* (2013.01); *H04S 1/007* (2013.01)

(58) Field of Classification Search
CPC ..... G10L 25/30; G10L 25/66; G10L 21/0232; G10L 21/0272; G10L 17/00; G10L 15/22;
(Continued)

(56) References Cited

U.S. PATENT DOCUMENTS 10,818,311 B2   10/2020  Xu et al.
2010/0183158 A1   7/2010  Haykin et al.
(Continued)

FOREIGN PATENT DOCUMENTS

CN   105474311 A   4/2016
CN   110751281 A   2/2020
(Continued)

OTHER PUBLICATIONS

Du, Research on Auditory Attention in Human-Machine Interactive System Concurrent Multi-Speech Environment, Doctoral Thesis submitted to Beijing Jiaotong University, dated Dec. 31, 2019.
(Continued)

*Primary Examiner* — Jakieda R Jackson
(74) *Attorney, Agent, or Firm* — Westbridge IP LLC (57) ABSTRACT

Disclosed are a target speaker separation system, an electronic device and a storage medium. The system includes: first, performing, jointly unified modeling on a plurality of cues based a masked pre-training strategy, to boost the inference capability of a model for missing cues and enhance the representation accuracy of disturbed cues; and second, constructing a hierarchical cue modulation module. A spatial cue is introduced into a primary cue modulation module for directional enhancement of a speech of a speaker; in an intermediate cue modulation module, the speech of the speaker is enhanced on the basis of temporal coherence of a dynamic cue and an auditory signal component; a steady-state cue is introduced into an advanced cue modulation module for selective filtering; and finally, the supervised learning capability of simulation data and the unsupervised learning effect of real mixed data are sufficiently utilized.

10 Claims, 4 Drawing Sheets

(51) Int. Cl.
*G10L 17/04* (2013.01)
*G10L 17/06* (2013.01)
*G10L 21/028* (2013.01)
*H04S 1/00* (2006.01)

(58) Field of Classification Search
CPC ... G10L 17/04; G10L 2015/223; G10L 21/08; G10L 17/02; G10L 17/06; H04R 5/02; G06F 3/167; G06F 3/165; G06F 40/30
See application file for complete search history.

(56) References Cited

U.S. PATENT DOCUMENTS

| | | | |
|---|---|---|---|
| 2019/0066713 A1* | 2/2019 | Mesgarani | G10L 17/26 |
| 2019/0269345 A1* | 9/2019 | Sriram | A61M 21/00 |
| 2019/0394568 A1* | 12/2019 | Sen | G06N 3/045 |
| 2020/0201435 A1* | 6/2020 | Ciccarelli | G06F 18/22 |
| 2021/0161418 A1* | 6/2021 | Kuruvila | A61B 5/12 |
| 2022/0007116 A1* | 1/2022 | Lunner | H04R 25/30 |
| 2022/0301563 A1* | 9/2022 | Chang | G10L 15/24 |

FOREIGN PATENT DOCUMENTS

| | | |
|---|---|---|
| CN | 111128197 A | 5/2020 |
| CN | 112071329 A | 12/2020 |
| CN | 113035225 A | 6/2021 |
| CN | 113035227 A | 6/2021 |
| CN | 108109619 B | 7/2021 |
| CN | 113035225 B | 2/2023 |

OTHER PUBLICATIONS

Zhang et al., Blind separation method based on Givens transformation and second-order oscillatory W-C-PSO, Application Research of Computers, 2020, 37(1), pp. 123-147, dated Jan. 31, 2020.

* cited by examiner

TARGET SPEAKER SEPARATION SYSTEM, DEVICE AND STORAGE MEDIUM

CROSS-REFERENCE TO RELATED APPLICATIONS

The present disclosure claims priority to Chinese Patent Application 202210602186.2, entitled "Target Speaker Separation System, Device and Storage Medium", filed on May 30, 2022, the entire content of which is incorporated herein by reference.

TECHNICAL FIELD

The application relates to the technical field of intelligent voice interaction and in particular relates to a target speaker separation system, a device and a storage medium.

BACKGROUND

With the development of information technology and Internet of Things, human-computer interaction has been integrated into people's daily life, and speech has become one of the important ways of human-computer interaction, which has significant advantages in the aspects of instantaneity, flexibility, and hardware dependency of information transfer over other information such as vision. In particular, in recent years, with the high-speed development of Internet technology and the massive popularity of intelligent terminal devices, commercial products of various built-in voice interaction modules, such as smart homes, smart speakers, smart vehicle environments, have emerged. However, as huge industry demands are increasing gradually, higher demands are also placed on relevant speech technology.

With the development of artificial intelligence and deep learning technology, the end-to-end speech recognition technology has become more and more mature, and at present, the speech recognition accuracy has approached the level of human beings in quiet or weak noise containing environments. However, for far-field speech, the speech recognition performance is greatly reduced under environments containing noisy noises and especially various other voice interferences, and under the influence of various reverberation environments and other factors. As a result, relevant speech separation tasks around the cocktail party problem are caused, the relevant algorithm for speech separation can be set as a front-end module for speech recognition, and acquisition of clean speech from a target source followed by speech recognition can greatly improve the speech recognition accuracy and promote the experience for human-machine interaction.

Conventional speech separation technologies are mainly signal processing-based methods, and recently driven by deep learning, speech separation is modeled as a data-driven supervised learning for exploring internal patterns of speech, speaker, and background noise. A large number of deep neural network-based speech separation methods, including blind source separation methods such as permutation invariant training (PIT) and time-domain audio separation network (TasNet), significantly improve the performance of a model on a speech separation benchmark dataset, and forcefully drive the settlement of speech separation tasks. However, in the task as above, the quantity of speakers is required to be specified in advance to try to separate all speaker voices completely, but, real auditory scenarios are usually complex, and the quantity of speakers who speak together is difficult to determine or dynamically changes. The assumption that the quantity of speakers who speak together is given in advance is too strict, which limits that mixed speech used in a training stage cannot be additionally mixed with noises containing the speech of a significant speaker to avoid model output mismatches; and additionally, the quantity of the speakers in the mixed speech is required to be acquired in advance in an inference stage to guide the model for speech separation at the inference stage.

To enable the model to adapt to real noisy auditory scenarios, some tasks begin to learn from the selective auditory attention behavior of the human brain under complex auditory scenarios, a partial-target-speaker-related cue-driven model is introduced to only focus on the speech of the target speaker in the mixed speech, but ignores other various types of the speech of interference speakers and ambient noises.

Disadvantages in Prior Art

1. Problems on how a speech separation model is effectively trained on real mixed data: some researchers attempt to perform weakly supervised learning using manually annotated information. For example, model training is performed by means of manually transcribed speech text to compute a connectionist temporal classification (CTC) loss for speech recognition after speech separation. However, this requires the use of some constraint algorithms to try to ensure that speech generated in the intermediate segment is not severely distorted. Still further tasks attempt to use a "unmix-and-remix" strategy to train the model directly on multi-source mixed data, but these tasks are prevalent with over- or under-separation problems.

2. Problems on limitations of scenarios and performance bottleneck ceiling of an auditory attention model constructed by single or some cues: some tasks attempt to introduce some target speaker-related cues to guide an auditory model to only focus on the speech of the target speaker in mixed speech, but to ignore other various types of speeches of interference speakers and ambient noises. For example, there are tasks to use voiceprints as speaker cues to guide the model to focus on the speech of the target speaker, there are also some tasks to integrate visual modalities with temporal coherence or construct neural network-based spatial cues to guide the model to focus on the speech of the target speaker. However, the auditory model constructed on the basis of the single or some cues as above have limitations on scenarios and show different robustness problems under different acoustic scenarios. For example, visual cues are easily shielded and are difficult to acquire, voiceprint cues have a limited enhancement effect on the speech of the target speaker in the case that the speakers have the similar timbre, while spatial cues are also unreliable in the case of severe reverberation and interference from spatially close sound sources.

3. Problems of restricted evaluation of the speech separation model on real mixed speech data: most speech separation methods are based on clean speech simulation to synthesize mixed speech as network input for training, clean speech as a label of an output signal performs fitting on a neural network based on a Scale-Invariant Signal-to-Distortion Ratio (SI-SDR) indicator, and performs batch objective evaluation on separation results. However, when the model evaluates real data, it is generally difficult to acquire clean speech of the target speaker from real mixed speech, so that the SI-SDR cannot be computed directly to fail to provide an objective measure, and in generally, people can only evaluate separated speeches subjectively, but there are subjective differences between individuals and inefficiencies caused by listening one by one.

SUMMARY

In order to solve the above-mentioned technical problems, the present application provides technical solutions of a target speaker separation system, a device and a storage medium.

In a first aspect, the present application discloses a target speaker separation system that includes:

a cue modulation module and a pre-trained auditory cue encoder; wherein, a two-channel multi-speaker mixed signal being input to the cue modulation module and the auditory cue encoder, respectively after one-dimensional temporal convolutional encoding;

wherein, the auditory cue encoder is configured for characterizing a brain signal-decoded auditory cue and a scenario-acquirable auditory cue uniformly as a spatial cue, a dynamic cue, and a steady-state cue;

wherein, the cue modulation module includes a primary modulation module, an intermediate modulation module, and an advanced modulation module;

wherein, the auditory cue encoder is configured for integrating a spatial cue extracted from an interaural time differences and a position into the primary modulation module, and the primary modulation module is configured for encoding the two-channel multi-speaker mixed signal subjected to one-dimensional temporal convolutional encoding and the spatial cue, to acquire a temporal semantic feature that varies with a low frequency over time;

wherein, the auditory cue encoder is configured for integrating a dynamic cue extracted from vision and envelope into the intermediate modulation module, and the intermediate modulation module is configured for encoding the temporal semantic feature and the dynamic cue, to acquire a steady-state feature exhibited in a feature space;

wherein, the auditory cue encoder is configured for integrating a steady-state cue extracted from fundamental frequencies and voiceprints into the advanced modulation module, and the advanced modulation module is configured for integrating the steady-state feature and the steady-state cue, outputting a final modulated speech feature, and then decoding an auditory signal of a target speaker by one-dimensional temporal transposed convolution, to output an auditory signal; and wherein, the auditory cue encoder extracting the spatial cue, the dynamic cue, and the steady-state cue by using a masked pre-training-based auditory cue inference method.

According to the system in the first aspect of the present application, extracting the spatial cue by using the masked pre-training-based auditory cue inference method includes:

predicting spatial cue representation by using the interaural time difference as a fitting target for the auditory cue encoder;

extracting the dynamic cue by using the masked pre-training-based auditory cue inference method includes:

using a reconstructed temporal envelope as a target for the auditory cue encoder to predict dynamic cue representation, and using a pre-trained visual encoding module to extract an auditory related dynamic cue from a visual stream for modeling; and extracting the steady-state cue by using the masked pre-training-based auditory cue inference method includes:

using the voiceprints as a discriminative target for the auditory cue encoder to predict steady-state cue representation.

According to the system in the first aspect of the present application, the target speaker separation system is trained in a semi-supervised learning way, wherein, a training phase includes two parts:

part 1: performing supervised training on a simulated mixed data set using clean speech; and part 2: performing unsupervised training on a real data set on the basis of a "unmix-and-remix" strategy.

According to the system in the first aspect of the present application, the performing supervised training on the simulated mixed data set using clean speech includes:

inputting a simulated mixed speech being composed of speeches of 1 to 3 speakers and background noises;

fixing a first channel to separate the speech of a target speaker while forcing the remainder of the simulated mixed speech to be separated into other channels with the best permutation loss;

training loss of a model, i.e., the target speaker separation system, including two losses: wherein, one loss being a target speaker separation loss $L_1$, training the model with a reconstruction loss of the model between a predicted speech of the first channel and a clean speech of the target speaker; and the other loss being a permutation invariant loss $L_2$ of a plurality of interfering sound sources, wherein, optimizing the model based on a reconstruction loss between predicted signals of the plurality of interfering sound sources and clean signals in the simulation data set, wherein the plurality of interfering sound sources including a speech of an interfering speaker and an ambient noise.

According to the system in the first aspect of the present application, wherein, performing unsupervised training on the real data set on the basis of the "unmix-and-remix" strategy includes:

first, randomly selecting two real mixed speeches from the real data set and defining that the speech of the target speaker is always present in a first real mixed speech while a second real mixed speech does not contain the speech of the target speaker; and then superimposing and mixing the two real mixed speeches and inputting the superimposed and mixed real mixed speeches into the model, and outputting, by the model, M separated audios, M being pre-set separated output channels; performing combined mixing on the M separated audio to form two predicted mixed speeches, and then computing a reconstruction loss $L_3$ of the two predicted mixed speeches and the two real mixed speeches.

According to the system in the first aspect of the present application, the semi-supervised learning includes:

acquiring a pseudo-clean reference speech of the target speaker from the real data set, supervising, by applying the pseudo-clean reference speech with a proportion p, a reconstruction loss $L_4$ of the sound source signal of the target speaker.

According to the system in the first aspect of the present application, wherein a loss function for the training phase is:

$$L=L_1+L_2+(1-p)L_3+p\,L_4$$

where L is the loss function for the training phase; p is a proportion coefficient of the pseudo-clean reference speech.

According to the system in the first aspect of the present application, wherein the method for acquiring the pseudo-clean reference speech of the target speaker from the real data set includes:

performing speech recognition performance evaluation on the speech of the target speaker predicted by a model driven by combination of each of the spatial cue, the dynamic cue, and the steady-state cue to find a predicted speech of the target speaker with the best speech recognition performance as the pseudo-clean reference speech.

In a second aspect, the present application provides an electronic device. The device includes a memory and a processor, wherein when computer programs stored in the memory are executed by the processor, the method in the target speaker separation system in the first aspect of the present application is implemented.

In a third aspect, the present application provides a non-transitory computer-readable storage medium having computer programs stored thereon, wherein the computer programs, when being executed by a processor, implement the method in the target speaker separation system in the first aspect of the present application.

The solutions provided by the present application have the following beneficial effects.

(1) Conventional speech separation paradigms cannot accommodate scenarios in real environments where the number of speakers is unknown or dynamically changing scenarios. The multi-cue driven target speaker separation paradigm of the present application fully integrates multiple types of auditory cues, including the spatial cue, the dynamic cue and the steady-state cue, extracts the speech of the target speaker from the noisy speech of multiple speakers, and can better accommodate the application in real environments.

(2) There are scenario limitations to some auditory models constructed on the basis of single or partial cues, for example, the acquisition of the visual cue is limited in some scenarios, the voiceprint cue is ineffective in the case that the speakers have the similar timbre, and the spatial cue also becomes unreliable in spaces where reverberation is severe. According to the present application, multiple types of auditory cues are integrated to construct a target speaker separation model to extract the speech of the target speaker, thereby remedying the scenario limitation and the upper limit of the performance of the single cue.

(3) Regarding to the problem of weak cue representation as well as cue missing, the present application provides the cue-masked pre-training-based method to learn associative representation among various cues, thereby achieving inference of missing cues, and further improving cue representation accuracy. The situations that the auditory cues are unavailable, low in discrimination, poor in reliability, and even completely wrong are effectively overcome, further improving the feasibility of industrial landing in real environments.

(4) Most speech separation tasks are based on a supervised training paradigm of simulated mixed speech, which has the problem that simulation data is somewhat different from real data, and the model has a scenario mismatch problem in the real scenario, resulting in poor generalization in practical application. The present application provides the semi-supervised learning method oriented to target speaker separation, which can be trained directly on real mixed speech, attempts to separate and output individual interfering sound sources at other channels while the fixed channel outputs the speech of the target speaker, effectively solving the problem of mismatching of data distribution in the real deploying environment.

(5) Current methods for evaluation of the model on the real mixed speech primarily rely on human subjective hearing, but there are subjective differences among different individuals, thereby failing to provide an objective indicator for fair evaluation. In addition, there are also some methods that use the separated speech as input of a speech recognition engine to evaluate indicators such as word error rate, but this also relies on the performance of the speech recognition engine, and the evaluation on the separation performance is not completely accurate. The present application provides the generation method of the pseudo-clean reference speech, which can be used to produce the pseudo-clean reference speech for acoustic evaluation on the basis of the real data.

(6) In addition, acoustic tuning of the model on the real data can be performed on the basis of the above-constructed pseudo-clean reference speech, further boosting the robustness of the model in real scenarios.

BRIEF DESCRIPTION OF THE DRAWINGS

In order to illustrate more clearly the specific embodiments of the present application or the technical solutions in the prior art, the drawings required to be used in the description of the specific embodiments or the prior art description will now be briefly described below. Obviously, the drawings in the following description are some embodiments of the present application, and those of ordinary skill in the art may also acquire other drawings according to these drawings without the inventive step.

DETAILED DESCRIPTION OF THE EMBODIMENTS

In order to make the objectives, solutions and advantages of embodiments of the present application clear, the technical solutions of the embodiments of the present application are described clearly and completely in conjunction with the drawings in the embodiments of the present application, and it will be apparent that the embodiments described are only some, but not all, embodiments of the present application. On the basis of the embodiments of the present application, all other embodiments acquired by those of ordinary skill in the art without the inventive step fall within the scope of protection of the present application.

Exemplary embodiments will be described in detail here, and examples thereof are illustrated in the drawings. When the following description involves figures, the same numeral in different figures refers to the same or similar elements unless otherwise indicated. The implementations described in the following exemplary embodiments do not represent all implementations consistent with the present application. On the contrary, they are merely examples of apparatuses and methods consistent with some aspects of the present application as detailed in the appended claims.

Terms used herein are only for the purpose of describing particular embodiments and are not intended to limit the present application. As used in the present application and the appended claims, the singular forms "a," "the" and "this" are intended to include the plural forms as well, unless the context clearly indicates otherwise. It should be understood that the term "and/or" used herein refers to and encompasses any and all possible combinations of one or more of associated listed items.

It should be understood that, although the terms "first, second, third or the like" may be employed herein to describe various information, but such information should not be limited to these terms. These terms are only used to distinguish the same type of information from each other. For example, first information may be referred to as second information, and similarly, second information may also be referred to as first information, without departing from the scope of the present application. The word "if" may be interpreted as "upon" or "when" or "in response to determination", depending on the context.

Since the daily life environment is complex, and a large amount of ambient noises and speeches of interfering speakers are present, current speech interaction devices can be well applied only in relatively quiet environments, and cannot be widely used in noisy environments. A speech interaction system has the problem of a low recognition rate in the real noisy environments, resulting in the problems of poor user experience, low usage rates, and the like. Various noises make speech interaction far from the satisfactory level of "good application" in generic scenarios. How to improve the auditory perception accuracy and robustness of the speech interaction technology to the target speaker in the real noisy environment has become a technical problem to be solved and an urgent social need at the moment.

The problem is defined as an audible "cocktail party problem". The surprising selective attention capability of the human auditory system in a noisy auditory scenario is described. For example, when we are in a multi-speaker cocktail party scenario, we can easily focus on the speech of a certain speaker of interest, and ignore interference from the speeches of other speakers and ambient noises. However, it is difficult to construct an auditory front-end model with human ear hearing capabilities. The present application is primarily directed to solving the problem of constructing a target speaker speech separation system oriented to real complex environments.

Specifically, a system construction process includes auditory cue inference, multi-cue integration, and adaptive learning as follows.

1) Auditory attention cues for driving target speaker speech separation can be acquired from multiple approaches such as decoding of brain signals of a listener or multi-modal information extraction in an auditory scenario. However, various cues may suffer from being unavailable, low in discrimination, poor in reliability, and even completely wrong. For example, visual cues are easily shielded to result in unavailability, spatial cues are easily influenced by nearby interfering sound sources to result in low discrimination, and voiceprint cues may become unreliable as acquired under different acoustic scenarios. These cue robustness problems as above, can all cause severe degradation of the performance subsequent cue-driven auditory attention models. Therefore, achieving the cue representation robustness is a key issue to ensure the effectiveness of multi-cue-driven auditory attention modeling.

2) Different cues differ in mechanisms during auditory attention modulation, for example, a variety of auditory attention cues may be acquired from brain signals and auditory scenarios, including speaker position, interaural time difference, vision, envelope, fundamental frequency, voiceprint, etc., wherein an envelope cue is a dynamic cue that changes over time, and a voiceprint cue is a steady-state cue that does not change over time, which are different in modulation mechanisms. An improper multi-cue integration approach may directly limit the upper limit of performance of cue-driven auditory attention. Therefore, constructing a unified multi-cue driven target speaker separation system is another problem to be solved.

3) Most auditory front-end models simulate multi-speaker mixed speech with a clean speech superimposition approach and perform learn with a speech of a target person as a training target. Trained models work well on homologous simulation datasets, but often suffer from various mismatching problems when deployed in real environments to result in the degradation of the performance, wherein these mismatching problems include different acoustic environments, different sound types, different microphone array structures, and the like. Therefore, improving the adaptive capability of the model on noisy data is a realistic problem to be solved in the environment-oriented deployment of the target speaker separation system.

Based on the above problems, the present application provides a multi-cue-driven and semi-supervised-learning target speaker separation system. First, the system promotes cue representation robustness by joint unified modeling of multiple cues on the basis of a masked pre-training strategy. Trying to use the masked pre-training-based approach can improve the inference capability of the model for missing cues and enhance the representation accuracy of disturbed cues; second, a hierarchical cue modulation module is constructed. A spatial cue is introduced into a primary cue modulation module to drive direct interaural auditory enhancement on the speech of the speaker; in an intermediate cue modulation module, speaker speech is enhanced on the basis of temporal coherence of a dynamic cue and an auditory signal component; a steady-state cue is introduced into an advanced cue modulation module for selective filtering; and finally, the supervised learning capability of simulation data and the unsupervised learning effect of real mixed data are sufficiently utilized, to construct a more efficient semi-supervised learning method under multi-cue constraints. "Unmix-and-remix" unsupervised learning is integrated into a cue-driven target speaker separation framework, and meanwhile, the self-adaptive capability of the system in the real noisy environment is promoted by utilizing contrastive learning between speaker-related cue representation and separated auditory signal representation.

Embodiment 1

Figure 1:
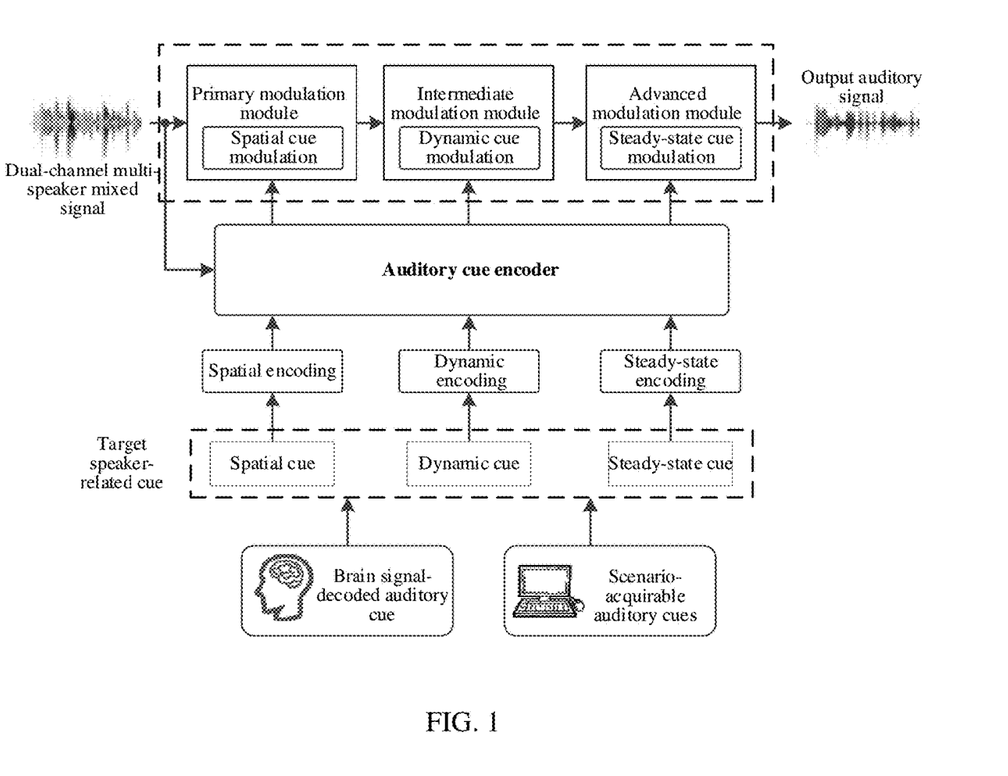
FIG. 1 is a structural diagram showing a target speaker separation system according to an embodiment of the present application.

In a first aspect, the present application discloses a target speaker separation system. FIG. 1 is a structural diagram showing a target speaker separation system according to an embodiment of the present application. Particularly as shown in FIG. 1, the system includes:

a cue modulation module and an auditory cue encoder; wherein a two-channel multi-speaker mixed signal is simultaneously input to the cue modulation module and the auditory cue encoder after being subjected to one-dimensional temporal convolutional encoding; the pre-trained auditory cue encoder characterizes a brain signal-decoded auditory cue and a scenario-acquirable auditory cue uniformly as a spatial cue, a dynamic cue, and a steady-state cue which serve as modulation cues for auditory attention; the cue modulation module includes a primary modulation module, an intermediate modulation module, and an advanced modulation module; the modulation module in each level can be constructed by any network structure as a backbone network, such as a Temporal Convolutional Network (TCN) or Transformer; the signal is still provided with a higher time resolution before entering the primary modulation module, the pre-trained auditory cue encoder integrates a spatial cue extracted from an interaural time difference and a position into the primary modulation module, driving directional interaural auditory enhancement on the speech of the target speaker by utilizing phase difference information of an interaural signal; the primary modulation module encodes the multi-speaker mixed signal subjected to one-dimensional temporal convolutional encoding and the spatial cue, to acquire a temporal semantic feature that varies with a low frequency over time; the pre-trained auditory cue encoder integrates a dynamic cue extracted from vision and envelope into the intermediate modulation module, binding the speech of the target speaker by utilizing time coherence of the dynamic cue and an auditory signal component; the intermediate modulation module performs abstract encoding on the temporal semantic feature and the dynamic cue by a deep network, to acquire a steady-state feature exhibited in a feature space; the pre-trained auditory cue encoder integrates a steady-state cue extracted from fundamental frequencies and voiceprints into the advanced modulation module, introducing the steady-state cue to filter the speech of the target speaker by utilizing acoustic invariance of the auditory signal; the advanced modulation module fuses the steady-state feature and the steady-state cue, outputs a final modulated speech feature, then decodes an auditory signal of the target speaker by one-dimensional temporal transposed convolution to output the auditory signal; brain signal-decoded auditory cue and the scenario-acquirable auditory cue are effectively integrated into the same framework, providing a wider range of applicable scenarios for an auditory attention model;

The steady-state feature is a steady-state feature that is exhibited in the feature space, i.e., a steady-state feature that shows a steady-state characteristic in a high-level feature space.

The auditory cue encoder extracts the spatial cue, the dynamic cue, and the steady-state cue by using a masked pre-training-based auditory cue inference method.

Figure 2:
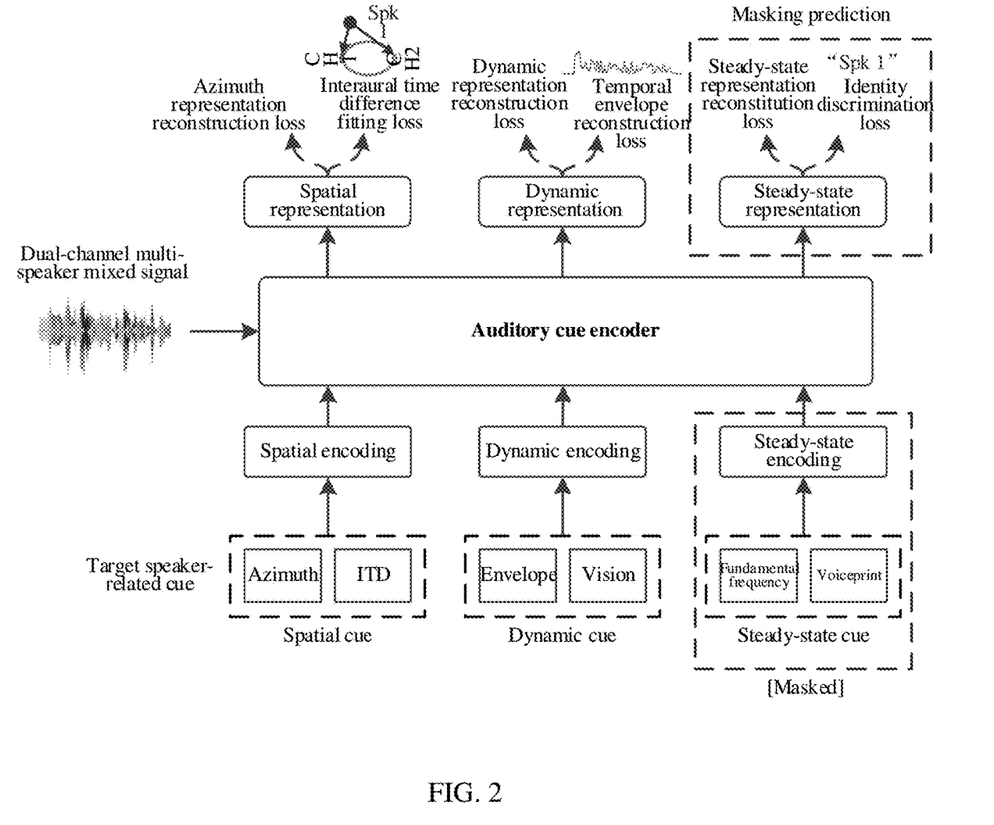
FIG. 2 is a schematic diagram showing masked pre-training-based auditory cue inference according to an embodiment of the present application.

As shown in FIG. 2, the position and the Interaural Time Difference (ITD) or the like of the speaker that are uniformly classified as the spatial cue, vision and envelope or the like that are uniformly classified as the dynamic cue, and the fundamental frequencies and the voiceprints or the like that are uniformly classified as the steady-state cue, are separately encoded. In the model training process, when a certain cue or a certain type of cue is masked, the auditory cue encoder is used, with a target of predicting masked cue representation. The massively pre-trained model may have not only the missing cue inference capability but also enhanced representation of non-missing cues. At the same time, the pre-trained auditory cue encoder uniformly characterizes multiple cues, which is more conducive to subsequent cue-driven auditory attention modeling.

In some embodiments, the method for extracting the spatial cue by using masked pre-training-based auditory cue inference includes that:
given that the spatial cue is modulated on the basis of the phase difference of the interaural information, there is a direct mapping relationship between the azimuth and the interaural time difference when the azimuth of the speaker and the apertures of dual microphones or an interaural interval are determined; and in scenarios where the apertures of the dual microphones, the interaural time difference cue is more universal, so that the interaural time difference is used as a fitting target for the auditory cue encoder to predict spatial cue representation.

The method for extracting the dynamic cue by using masked pre-training-based auditory cue inference includes that:
for the dynamic cue of envelope and vision, the envelope cue directly characterizes an amplitude modulation cue of a target auditory signal, while the vision cue contains a large amount of redundant information that requires further extraction of visual semantic features related to the auditory signal by a visual encoder;
using a reconstructed temporal envelope as a target for the auditory cue encoder to predict dynamic cue representation; and
using a pre-trained visual encoding module to extract an auditory related dynamic cue from a visual stream for modeling.

The method for extracting the steady-state cue by using masked pre-training-based auditory cue inference includes that:
the steady-state cue characterizes the time-invariant acoustic feature of an auditory object, and the fundamental frequencies decoded from the brain signal and the voiceprints extracted from speaker registration sound both characterize the steady-state cue; since the voiceprint cue contains more comprehensive acoustic features, voiceprint feature extraction is performed with a massively pre-trained voiceprint encoder, and the voiceprints are used as a discriminative target for the auditory cue encoder to predict steady-state cue representation.

Figure 3:
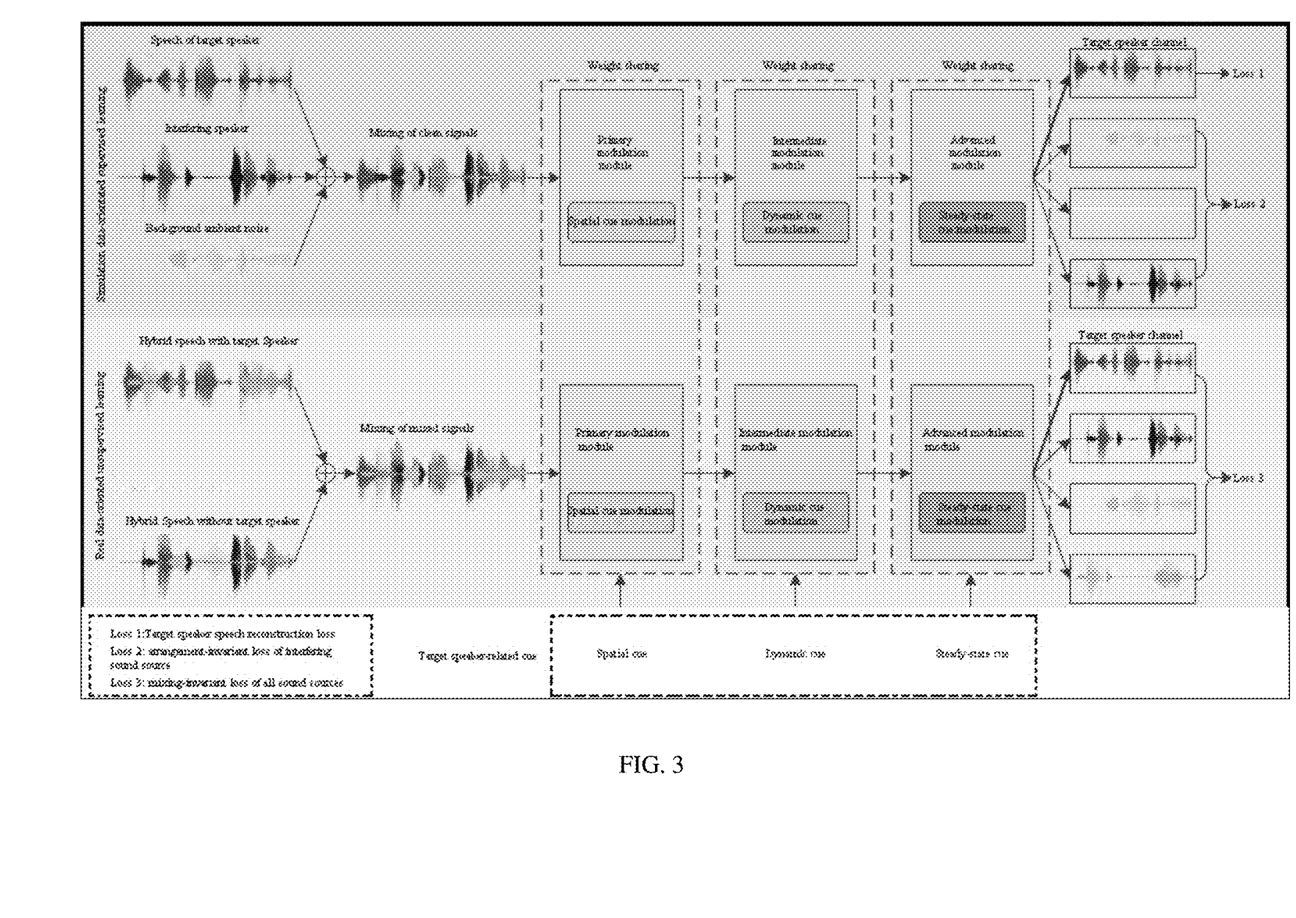
FIG. 3 is a schematic diagram showing a semi-supervised learning method for multi-cue driven target speaker separation according to an embodiment of the present application.

In some embodiments, as shown in FIG. 3, the target speaker separation system is trained using semi-supervised learning with a training phase divided into two parts:
part 1: supervised training with clean speech on a simulated mixed data set; and
part 2: unsupervised training on a real data set on the basis of a "unmix-and-remix" strategy.

In some embodiments, the method for supervised training with clean speech on the simulated mixed dataset includes:
an input simulated mixed speech being composed of speeches of 1 to 3 speakers and background noises;
a first channel being fixed to separate the speech of the target speaker while forcing the remainder of the simulated mixed speech to be separated into other channels with the best permutation loss;
a model, i.e., the target speaker separation system, including two training losses: a target speaker separation loss $L_1$, the model being trained with a reconstruction loss of the model between a predicted speech of the first channel and a clean speech of the target speaker; and
the other loss being a permutation invariant loss $L_2$ of a plurality of interfering sound sources, and then the model being optimized based on a reconstruction loss between predicted signals of the plurality of interfering sound sources and clean signals in a simulation data set, wherein the plurality of interfering sound sources include a speech of an interfering speaker and an ambient noise.

In some embodiments, the method for unsupervised training on the real data set on the basis of the "unmix-and-remix" strategy includes:

first, randomly selecting two real mixed speeches from the real data set and defining that the speech of the target speaker is always present in a first real mixed speech while a second real mixed speech does not contain the speech of the target speaker; and then superimposing and mixing the two real mixed speeches and inputting the superimposed and mixed real mixed speeches into the model, and outputting, by the model, M separated audios, M being pre-set separated output channels.

In some embodiments, M is set to be 4.

Since the clean speech and background ambient noise for each speaker cannot be independently acquired from the real mixed speech, supervised training of independent acoustic signals cannot be performed on separated audios; here, combined mixing is performed on the separated M audio to form two predicted mixed speeches, and then a reconstruction loss $L_3$ of the two predicted mixed speeches and the two real mixed speeches is computed. The combination strategy that the combined mixing is performed on the M audios to form the two mixed speeches is determined in the manner of a minimum value of the reconstruction loss $L_3$, and it is defined that that an audio predicted by a first output channel can only participate in the reconstruction of the first mixed speech, audios predicted by other output channels respectively participate in the reconstruction of the two mixed speeches in a combined manner of the minimum value of the reconstruction loss $L_3$.

In some embodiments, the semi-supervised learning method further includes:

acquiring a pseudo-clean reference speech of the target speaker from the real data set, supervising, by applying the pseudo-clean reference speech with a proportion p, a reconstruction loss $L_4$ of a sound source signal of the target speaker.

In some embodiments, a loss function for the training phase is:

$$L=L_1+L_2+(1-p)L_3+p\,L_4$$

where L is the loss function for the training phase; p is a proportion coefficient of the pseudo-clean reference speech.

The above losses are computed on the basis of an acoustic signal reconstruction error between a reference signal y and a model prediction signal $\hat{y}$, for example, Minimum Mean Squared Error (MSE), Signal-to-Noise Ratio (SNR), or Scale-Dependent Signal-to-Distortion Ratio (SD-SDR) can be used as a way to compute the acoustic signal reconstruction error. A computing approach of SNR loss is taken as an example, which is as follows:

$$L(y,\hat{y}) = -10\log_{10}\frac{\|y\|^2}{\|y-\hat{y}\|^2}.$$

In $L_1$, the reference signal y is the clean speech of the target speaker acquired from the simulation data set, and the model prediction signal $\hat{y}$ is the speech of the target speaker predicted by the model; in $L_2$, the reference signal y is the clean speech of the interfering speaker and the ambient noise acquired from the simulation data set, and the model prediction signal $\hat{y}$ is the clean speech of the interfering speaker speech and the ambient noise predicted by the model; in $L_3$, the reference signal y is the two real mixed speeches acquired from the real data set, and the model prediction signal $\hat{y}$ is the two predicted mixed speeches model formed by combined mixing of the M audios separated by the model; and in $L_4$, the reference signal y is the pseudo-clean reference speech of the target speaker acquired from the real data set, and the model prediction signal $\hat{y}$ is the speech of the target speaker predicted by the model.

Regarding to the problem of restricted evaluation of the speech separation model on the real mixed speech data, the predicted speech is generated by sufficiently utilizing the advantages of the combination of the spatial cue, the dynamic cue, and the steady-state cue under different acoustic conditions, and then, on the basis of the degree of improvement in speech recognition performance, an optimally predicted speech is selected as the pseudo-clean reference speech for acoustic performance evaluation and model tuning of the target speaker separation system.

In some embodiments, the method for acquiring the pseudo-clean reference speech of the target speaker from the real data set includes:

performing speech recognition performance evaluation on the speech of the target speaker predicted by a model driven by combination of each of the spatial cue, the dynamic cue, and the steady-state cue to find a predicted speech of the target speaker with the best speech recognition performance as the pseudo-clean reference speech.

In summary, compared with the prior art, the technical solutions in the various aspects of the present application have the following advantages.

(1) Conventional speech separation paradigms cannot accommodate scenarios in real environments where the number of speakers is unknown or dynamically changing scenarios. The multi-cue-driven target speaker separation paradigm of the present application fully integrates multiple types of auditory cues, including the spatial cue, the dynamic cue and the steady-state cue, extracts the speech of the target speaker from the noisy speech of multiple speakers, and can better accommodate the application in real environments.

(2) There are scenario limitations to some auditory models constructed on the basis of single or partial cues, for example, the acquisition of the visual cue is limited in some scenarios, the voiceprint cue is ineffective in the case that the speakers have the similar timbre, and the spatial cue also becomes unreliable in spaces where reverberation is severe. According to the present application, multiple types of auditory cues are integrated to construct the target speaker separation model to extract the speech of the target speaker, thereby remedying the scenario limitation and the upper limit of the performance of the single cue.

(3) Regarding to the problem of weak cue representation as well as cue missing, the present application provides the cue-masked pre-training-based methods to learn associative representation among various cues, thereby achieving inference of missing cues, and further improving cue representation accuracy. The situations that the auditory cues are unavailable, low in discrimination, poor in reliability, and even completely wrong are effectively overcome, further improving the feasibility of industrial landing in real environments.

(4) Most speech separation tasks are based on a supervised training paradigm of simulated mixed speech, which has the problem that simulation data is somewhat different from real data, and the model has a scenario mismatch problem in the real scenario, resulting in poor generalization in practical application. The present application provides the semi-supervised learning method oriented to target speaker separation, which can be trained directly on the real mixed speech, attempts to separate and output individual interfering sound sources at other channels while the fixed channel outputs the speech of the target speaker, effectively solving the problem of mismatching of data distribution in the real deploying environment.

(5) Current methods for evaluation of the model on the real mixed speech primarily rely on human subjective hearing, but there are subjective differences among different individuals, thereby failing to provide an objective indicator for fair evaluation. In addition, there are also some methods that use the separated speech as input of a speech recognition engine to evaluate indicators such as word error rate, but this also relies on the performance of the speech recognition engine, and the evaluation on the separation performance is not completely accurate. The present application provides the generation method of the pseudo-clean reference speech, which can be used to produce the pseudo-clean reference speech for acoustic evaluation on the basis of the real data.

(6) In addition, acoustic tuning of the model on the real data can be performed on the basis of the above constructed pseudo-clean reference speech, further boosting the robustness of the model in real scenarios.

Embodiment 2

The present application discloses an electronic device including a memory and a processor, wherein a computer program is stored in the memory, and when executed by the processor, performs the method in the target speaker separation system in the first aspect of the present application.

Figure 4:
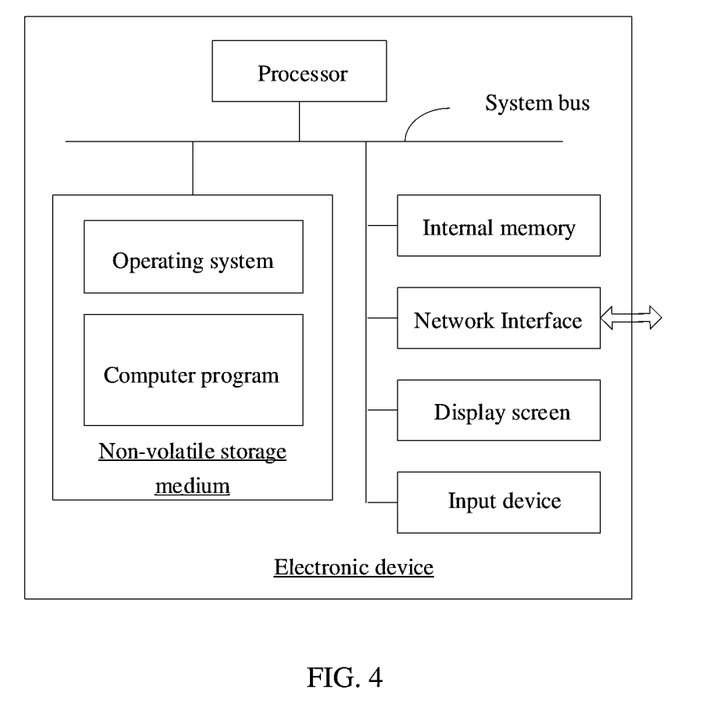
FIG. 4 is a structural diagram showing an electronic device according to an embodiment of the present application.

FIG. 4 is a structural diagram showing an electronic device according to an embodiment of the present application. As shown in FIG. 4, the electronic device includes a processor, a memory, a communication interface, a display screen, and an input device which are connected via a system bus. The processor of the electronic device is configured to provide computing and control capabilities. The memory of the electronic device includes a non-volatile storage medium and an internal memory. The non-volatile storage medium stores an operating system and a computer program. The internal memory provides an environment for operation of the operating system and the computer program in the non-volatile storage medium. The communication interface of the electronic device is configured to communicate with an external terminal in a wired or wireless manner, and the wireless manner is realized by WIFI, operator network, Near Field Communication (NFC), or other technologies. The display screen of the electronic device may be a liquid crystal display screen or an electronic ink display screen. The input device of the electronic device may be a touch layer overlaid on the display screen, or may also be a key, a trackball or a touchpad provided on a housing of the electronic device, or an external keyboard, a touchpad, a mouse, or the like.

Those skilled in the art should understand that, the structure illustrated in FIG. 4 is merely a structural diagram of a portion related to the technical solution of the present disclosure, and does not constitute a limitation to the electronic device to which the solution of the present application is applied. A specific electronic device may include more or fewer components than illustrated in the diagram, or combine certain components, or have a different permutation of components.

Embodiment 3

The present application discloses a storage medium, and particularly relates to a computer-readable storage medium, wherein the computer-readable storage medium stores a computer program, and the computer program, when executed by a processor, implements the steps of any target speaker separation method disclosed in the first aspect of the present application.

Note that the technical features of the above embodiments can be combined randomly, and not all possible combinations of the technical features in the above embodiments are described in order to make the description concise. However, as long as there is no contradiction in the combinations of the technical features, the combination should be considered to be within the scope of the description. The above embodiments express only a few embodiments of the present application, and the description is specific and detailed, but is not to be construed as limiting the scope of the patent. It should be noted that those of ordinary skill in the art can make numerous variations and modifications without departing from the concept of the present disclosure, all of which fall within the scope of the present application. Therefore, the scope of protection of the present patent application shall be subject to the appended claims.

The embodiments of the subject matter and the functional operations described in the description can be implemented in digital electronic circuitry, in tangibly-embodied computer software or firmware, in computer hardware including the structures disclosed in the description and their structural equivalents, or in combinations of one or more thereof. The embodiments of the subject matter described in the description can be implemented as one or more computer programs, i.e., one or more modules of computer program instructions encoded on a tangible non transitory program carrier for execution by, or to control the operation of, a data processing device. Alternatively or additionally, the program instructions can be encoded on an artificially-generated propagation signal, for example, a machine-generated electrical, optical, or electromagnetic signal. This signal is generated to encode and transmit information to a suitable receiver for execution by the data processing device. The computer storage medium can be a machine-readable storage device, a machine-readable storage substrate, a random or serial access memory device, or a combination of one or more thereof.

The processing and logic flows described in the description can be performed by one or more programmable computers executing one or more computer programs to perform corresponding functions by operating on input data and generating output. The processing and logic flows can also be performed by special-purpose logic circuitry, e.g., a Field Programmable Gate Array (FPGA) or an ASIC (Application Specific Integrated Circuit), and an apparatus can also be implemented as special purpose logic circuitry.

A computer suitable for the execution of a computer program includes, for example, general and/or special-purpose microprocessors, or any other kind of central processing units. Generally, a central processing unit may receive instructions and data from a read-only memory and/or a random access memory. The basic components of the computer include a central processing unit for performing or executing instructions, and one or more memory devices for storing instructions and data. Generally, the computer may also include one or more mass storage devices such as a magnetic disk, a magneto optical disk, or an optical disk, or may be operatively coupled to the mass storage devices to receive data therefrom or transfer data thereto, or to implement both. However, the computer does not have to be equipped with such a device. Moreover, the computer can be embedded in another device, e.g., a mobile telephone, a Personal Digital Assistant (PDA), a mobile audio or video player, a game console, a Global Positioning System (GPS) receiver, or a portable storage device for a Universal Serial Bus (USB) flash drive.

A computer-readable medium suitable for storing computer program instructions and data includes all forms of non-volatile memories, media and memory devices, including, for example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, the special-purpose logic circuitry.

Although the description contains many specific implementation details, these implementation details should not be construed as limitations on the scope of any application or on the claimed scope, and are mainly used for describing the features of the particular embodiments of specific applications. Certain features that are described in the multiple embodiments in the description can also be implemented in combination in a single embodiment. On the other hand, various features that are described in the single embodiment can also be implemented in multiple embodiments separately or in any suitable sub combination. Moreover, although the features may function as described above in certain combinations and even initially claimed as such, one or more features from a claimed combination can be removed from the combination in some cases, and the claimed combination may be directed to a sub combination or variations of the sub combination.

Similarly, although operations are described in the drawings in a particular order, this should not be understood as requiring that these operations be performed in particular order shown or in sequential order, or that all illustrated operations be performed, to achieve desirable results. In certain circumstances, multitasking and parallel processing may be advantageous. Moreover, the separation of various system modules and components in the above embodiments should not be understood as requiring such separation in all embodiments, and it should be understood that the described program components and systems can generally be integrated together in a single software product or packaged into multiple software products.

Thus, the specific embodiments of the subject matter have been described. Other embodiments are within the scope of the appended claims. In certain circumstances, the actions recited in the claims can be performed in a different order and still achieve desirable results. In addition, the processing described in the drawings does not have to be performed in particular order shown, or in sequential order, to achieve desirable results. In certain implementations, multitasking and parallel processing may be advantageous.

The above descriptions are only preferred embodiments of the present application and are not intended to limit the present application. Any modification, equivalent replacement, improvement, etc., made within the spirit and principle of the present application shall be included within the scope of protection of the present application.

What is claimed is:

1. A target speaker separation system, comprising: a cue modulation module and a pre-trained auditory cue encoder; wherein a two-channel multi-speaker mixed signal is input to the cue modulation module and the auditory cue encoder, respectively after one-dimensional temporal convolutional encoding;

wherein, the auditory cue encoder is configured for characterizing a brain signal-decoded auditory cue and a scenario-acquirable auditory cue uniformly as a spatial cue, a dynamic cue, and a steady-state cue; wherein, the position and an interaural time difference of the speaker are uniformly classified as the spatial cue, vision and envelope or the like are uniformly classified as the dynamic cue, and fundamental frequencies and voiceprints or the like are uniformly classified as the steady-state cue;

wherein, the cue modulation module comprises a primary modulation module, an intermediate modulation module, and an advanced modulation module;

wherein, the auditory cue encoder is configured for integrating a spatial cue extracted from an interaural time difference and a position into the primary modulation module, and the primary modulation module is configured for encoding the two-channel multi-speaker mixed signal subjected to one-dimensional temporal convolutional encoding and the spatial cue, to acquire a temporal semantic feature that varies with a low frequency over time;

wherein, the auditory cue encoder is configured for integrating a dynamic cue extracted from vision and envelope into the intermediate modulation module, and the intermediate modulation module is configured for encoding the temporal semantic feature and the dynamic cue, to acquire a steady-state feature exhibited in a feature space;

wherein, the auditory cue encoder is configured for integrating a steady-state cue extracted from fundamental frequencies and voiceprints into the advanced modulation module, and the advanced modulation module is configured for integrating the steady-state feature and the steady-state cues, outputting a final modulated speech feature, and then decoding an auditory signal of a target speaker by one-dimensional temporal transposed convolution, to output an auditory signal; and wherein, the auditory cue encoder extracts the spatial cue, the dynamic cue, and the steady-state cue by using a masked pre-training-based auditory cue inference method.

2. The target speaker separation system according to claim 1, wherein extracting the spatial cue by using the masked pre-training-based auditory cue inference method comprises:

predicting spatial cue representation by using the interaural time difference as a fitting target for the auditory cue encoder;

extracting the dynamic cue by using the masked pre-training-based auditory cue inference method comprises:

using a reconstructed temporal envelope as a target for the auditory cue encoder to predict dynamic cue representation, and using a pre-trained visual encoding module to extract an auditory related dynamic cue from a visual stream for modeling; and extracting the steady-state cue by using the masked pre-training-based auditory cue inference method comprises:
using the voiceprints as a discriminative target for the auditory cue encoder to predict steady-state cue representation.

3. The target speaker separation system according to claim 1, wherein the target speaker separation system is trained in a semi-supervised learning way, a training phase comprises two parts:
part 1: performing supervised training on a simulated mixed data set using clean speech; and
part 2: performing unsupervised training on a real data set on the basis of a "unmix-and-remix" strategy.

4. The target speaker separation system according to claim 3, wherein performing supervised training on the simulated mixed data set using clean speech comprises:
inputting a simulated mixed speech being composed of speeches of 1 to 3 speakers and background noises;
fixing a first channel to separate the speech of a target speaker while forcing the remainder of the simulated mixed speech to be separated into other channels with the best permutation loss;
training loss of a model, the target speaker separation system, comprising two losses, wherein, one loss being a target speaker separation loss L1, training the model with a reconstruction loss of the model between a predicted speech of the first channel and a clean speech of the target speaker;
the other loss being a permutation invariant loss L2 of a plurality of interfering sound sources, wherein, optimizing the model based on a reconstruction loss between predicted signals of the plurality of interfering sound sources and clean signals in the simulation data set, wherein the plurality of interfering sound sources comprising a speech of an interfering speaker and an ambient noise.

5. The target speaker separation system according to claim 4, wherein performing unsupervised training on the real data set on the basis of the "unmix-and-remix" strategy comprises:
first, randomly selecting two real mixed speeches from the real data set and defining that the speech of the target speaker is always present in a first real mixed speech while a second real mixed speech does not contain the speech of the target speaker; and
then superimposing and mixing the two real mixed speeches and inputting the superimposed and mixed real mixed speeches into the model, and outputting, by the model, M separated audios, M being pre-set separated output channels; performing combined mixing on the M separated audio to form two predicted mixed speeches, and then computing a reconstruction loss L3 of the two predicted mixed speeches and the two real mixed speeches.

6. The target speaker separation system according to claim 5, wherein the semi-supervised learning comprises:
acquiring a pseudo-clean reference speech of the target speaker from the real data set, supervising, by applying the pseudo-clean reference speech with a proportion p, a reconstruction loss L4 of the sound source signal of the target speaker.

7. The target speaker separation system according to claim 6, wherein a loss function for the training phase is:

$$L=L_1+L_2+(1-p)L_3+p\ L_4$$

wherein L is the loss function for the training phase; p is a proportion coefficient of the pseudo-clean reference speech.

8. The target speaker separation system according to claim 6, wherein the method for acquiring the pseudo-clean reference speech of the target speaker from the real data set comprises:
performing speech recognition performance evaluation on the speech of the target speaker predicted by a model driven by combination of each of the spatial cue, the dynamic cue, and the steady-state cue to find a predicted speech of the target speaker with the best speech recognition performance as the pseudo-clean reference speech.

9. An electronic device, comprising a memory and a processor, wherein when computer programs stored in the memory are executed by the processor, the method in the target speaker separation system according to claim 1 is implemented.

10. A non-transitory computer-readable storage medium having computer programs stored thereon, wherein the computer programs, when being executed by a processor, implement the method in the target speaker separation system according to claim 1.

* * * * *